United States Patent
Brar et al.

(10) Patent No.: US 11,138,077 B2
(45) Date of Patent: Oct. 5, 2021

(54) SYSTEM AND METHOD FOR BOOTSTRAPPING REPLICAS FROM ACTIVE PARTITIONS

(71) Applicant: Walmart Apollo, LLC, Bentonville, AR (US)

(72) Inventors: Navinder Pal Singh Brar, Bengaluru (IN); Ashish Surana, Bangalore (IN); Deepak Goyal, Bangalore (IN); Giridhar Addepalli, Bangalore (IN); Sébastien Péhu, Novato, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 163 days.

(21) Appl. No.: 16/256,856

(22) Filed: Jan. 24, 2019

(65) Prior Publication Data

US 2020/0241974 A1 Jul. 30, 2020

(51) Int. Cl.
*G06F 11/14* (2006.01)
*G06F 16/27* (2019.01)

(52) U.S. Cl.
CPC ........ *G06F 11/1469* (2013.01); *G06F 16/278* (2019.01); *G06F 2201/80* (2013.01)

(58) Field of Classification Search
CPC ...... G06F 11/14; G06F 11/1469; G06F 11/20; G06F 11/2076; G06F 16/27; G06F 16/278
USPC .......................................................... 714/19
See application file for complete search history.

(56) References Cited

U.S. PATENT DOCUMENTS

| 6,256,748 | B1* | 7/2001 | Pinson ................ G06F 11/2007 714/6.23 |
| 6,701,464 | B2* | 3/2004 | Austen ................ G06F 11/0712 714/48 |
| 7,484,125 | B2* | 1/2009 | Wei ...................... G06F 11/2289 714/10 |
| 9,477,743 | B2* | 10/2016 | Smith ..................... G06F 16/285 |
| 9,715,469 | B1* | 7/2017 | Arroyo ................... G06F 13/24 |
| 2005/0159927 | A1* | 7/2005 | Cruz ..................... G06F 11/0748 702/188 |
| 2007/0006015 | A1* | 1/2007 | Rao ...................... G06F 11/2028 714/4.1 |
| 2007/0288526 | A1* | 12/2007 | Mankad ............... G06F 11/1662 |
| 2009/0063123 | A1* | 3/2009 | Buckler ................ G06F 16/285 703/22 |
| 2011/0099266 | A1* | 4/2011 | Calder ...................... G06F 8/65 709/224 |
| 2011/0106862 | A1* | 5/2011 | Mamidi ................ G06F 16/185 707/823 |
| 2011/0106863 | A1* | 5/2011 | Mamidi ................ G06F 16/185 707/823 |
| 2015/0278329 | A1* | 10/2015 | Hrle ........................ G06F 16/27 707/615 |

(Continued)

*Primary Examiner* — Kamini B Patel
(74) *Attorney, Agent, or Firm* — Duane Morris LLP; Manita Rawat

(57) ABSTRACT

A system and method of bootstrapping replicas from existing partitions is disclosed. A distributed database is maintained by a system. The distributed database includes a first partition copy and a second partition copy each containing a database. A failure of the first partition copy is detected and a third partition copy including an empty database is generated. The database of the second partition copy is copied to the empty database of the third partition copy and the third partition copy is designated as one of an active partition copy or a replica partition copy.

20 Claims, 7 Drawing Sheets

(56) References Cited

U.S. PATENT DOCUMENTS

| | | | |
|---|---|---|---|
| 2016/0004571 A1* | 1/2016 | Smith | G06F 16/278 |
| | | | 718/105 |
| 2016/0092205 A1* | 3/2016 | Seovic | G06F 9/5072 |
| | | | 717/170 |
| 2016/0092263 A1* | 3/2016 | Gleyzer | G06F 9/46 |
| | | | 718/102 |
| 2017/0197632 A1* | 7/2017 | Rieth | B60W 50/082 |
| 2018/0101589 A1* | 4/2018 | Shi | G06F 16/273 |
| 2019/0340166 A1* | 11/2019 | Raman | H04L 41/5009 |
| 2019/0340167 A1* | 11/2019 | Raman | G06F 16/2452 |
| 2019/0340168 A1* | 11/2019 | Raman | G06F 16/2272 |
| 2019/0340265 A1* | 11/2019 | Raman | G06F 16/2365 |
| 2019/0340273 A1* | 11/2019 | Raman | G06F 16/903 |
| 2019/0340291 A1* | 11/2019 | Raman | G06F 11/2023 |
| 2019/0342188 A1* | 11/2019 | Raman | H04L 41/5022 |
| 2019/0342379 A1* | 11/2019 | Shukla | H04L 41/0896 |
| 2019/0342380 A1* | 11/2019 | Thota | G06F 16/2246 |

* cited by examiner

SYSTEM AND METHOD FOR BOOTSTRAPPING REPLICAS FROM ACTIVE PARTITIONS

TECHNICAL FIELD

This application is related to distributed databases and, more particularly, to generating replacement active and replica partitions in a distributed database.

BACKGROUND

Distributed databases include active partitions and replica (or backup) partitions that are maintained in a similar state to the active partitions. A predetermined number of active partitions and replica partitions may be maintained based on requirements of the distributed database (e.g., 1 active partition, 1 replica partition; 1 active partition, 2 replica partitions; 2 active partitions, 2 replica partitions; etc.). When an active partition fails, for example due to machine failure, network outage, etc., the distributed database replaces the active partition with one of the replica partitions.

After replacing a failed active partition (or when a replica partition fails), the distributed database must replace a replica partition to maintain the required replica scheme. Current systems maintain a changelog indicating all changes made to a partition from the first instantiation of the partition. When a new replica is to be generated, the distributed database builds a new replica by instantiating an empty replica and re-executing every entry in the changelog. Current systems require extensive data to be maintained in the changelog to allow a complete replica to be built. In addition, building a replica from the changelog is processing and time intensive.

SUMMARY

In various embodiments, a system, including a computing device is disclosed. The computing device is configured to maintain a distributed database including a first partition copy and a second partition copy each containing a database. The computing device detects a failure of the first partition copy and generates a third partition copy including an empty database. The database of the second partition copy is copied to the empty database of the third partition copy. The computing device is configured to designate the third partition copy as one of an active partition copy or a replica partition copy.

In various embodiments, a non-transitory computer readable medium having instructions stored thereon is disclosed. The instructions, when executed by a processor cause a device to perform operations including maintaining a distributed database comprising a first partition copy and a second partition copy each containing a database and detecting a failure of the first partition copy. A third partition copy including an empty database is generated and the database of the second partition copy is copied to the empty database of the third partition copy. The third partition copy is designated as one of an active partition copy or a replica partition copy.

In various embodiments, a method is disclosed. The method includes maintaining a distributed database comprising a first partition copy and a second partition copy each containing a database and detecting a failure of the first partition copy. A third partition copy including an empty database is generated and the database of the second parti- tion copy is copied to the empty database of the third partition copy. The third partition copy is designated as one of an active partition copy or a replica partition copy.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
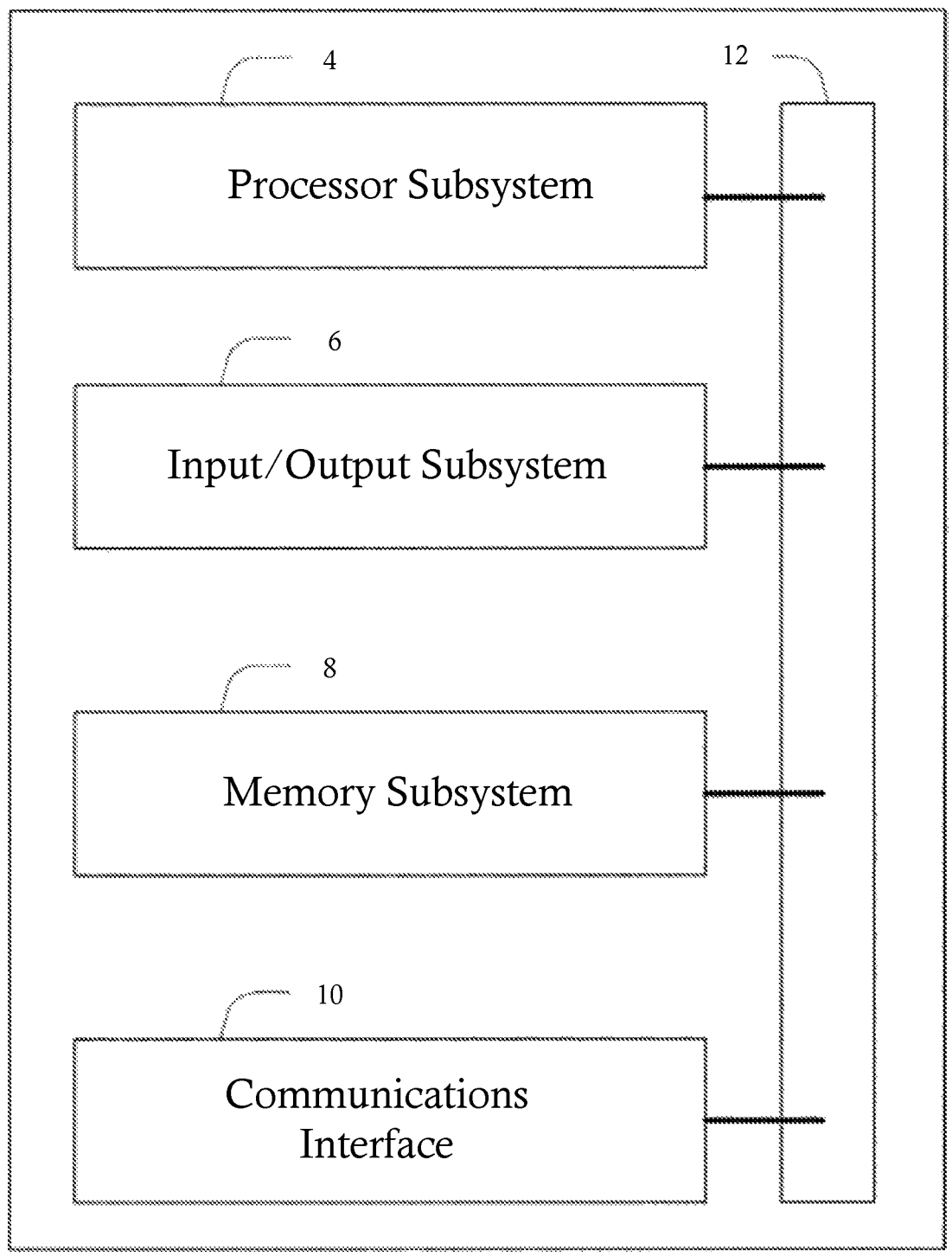
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

In various embodiments, a system and method of bootstrapping a partition copy from an existing partition copy is disclosed. A distributed database including a first partition copy and a second partition copy is maintained. Each partition copy contains a database. When a partition copy fails, such as the first partition copy, the failure is and a new, or third, partition copy is created. The third partition copy includes an empty database. The database of an existing and available partition copy, such as the second partition copy, is copied to the empty database of the third partition copy. The third partition copy is then designated as one of an active partition copy or a replica partition copy (depending on which is required based on the required replica scheme).

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming In some embodiments a compiler or interpreter is comprised to convert the instruction set into machine executable code for execution by the processing subsystem 4.

Figure 2:
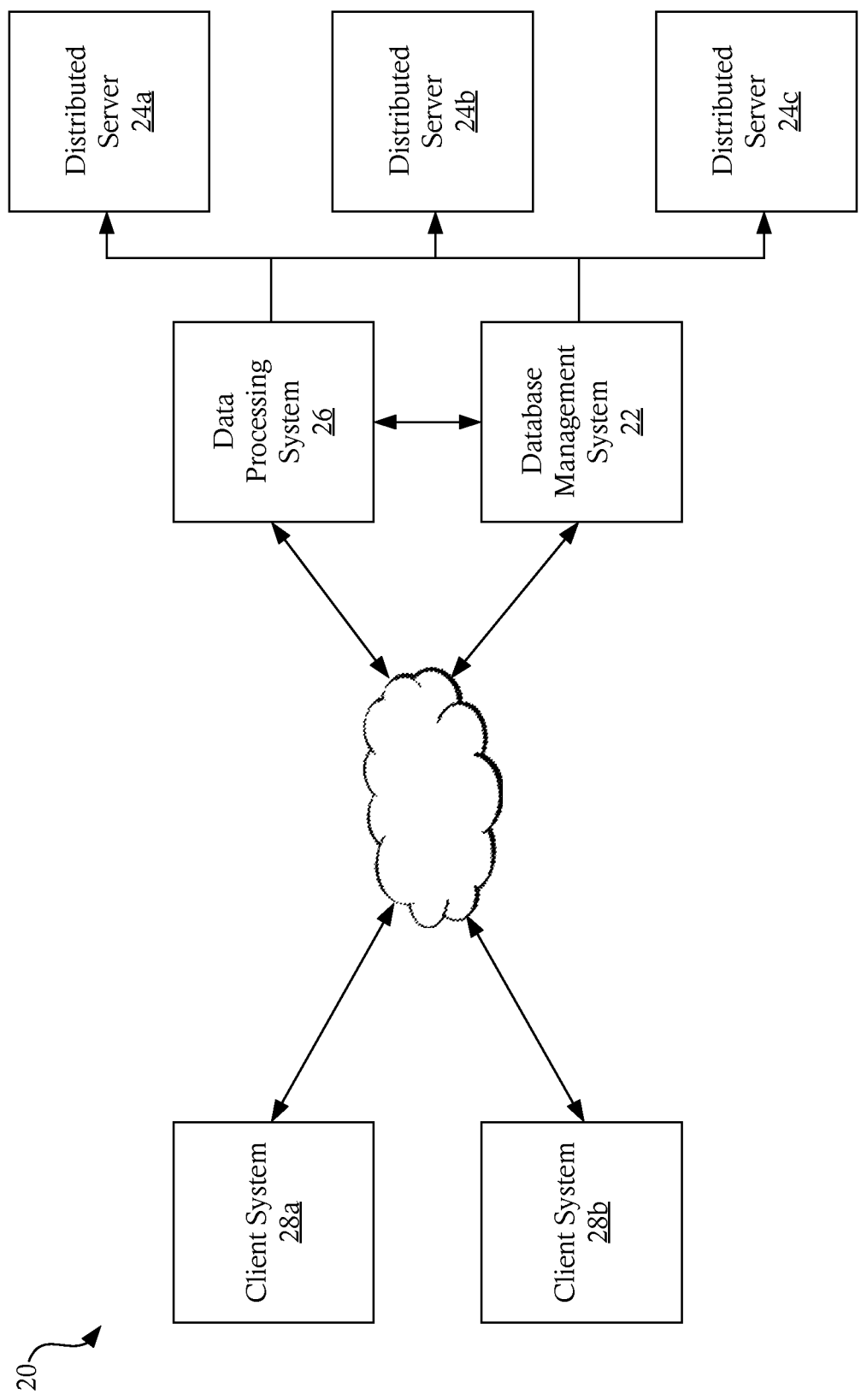
FIG. 2 illustrates a network configured to provide replica generation by bootstrapping replica data from an existing partition, in accordance with some embodiments.

FIG. 2 illustrates a network 20 configured to provide replica generation by bootstrapping data from an active partition, in accordance with some embodiments. The network 20 includes a distributed database management system 22, a plurality of distributed servers 24a-24c, a data processing system 26, and a plurality of user systems 28a, 28b. Each of the systems 22-28b can include a system 2 as described above with respect to FIG. 1, and similar description is not repeated herein. Although the systems 22-28b are each illustrated as independent systems, it will be appreciated that each of the systems 22-28b may be combined, separated, and/or integrated into one or more additional systems. For example, in some embodiments, distributed database management system 22, one or more of the plurality of distributed servers 24a-24c, and/or the data ingestion system 26 may be implemented by a shared server or shared network system. Similarly, the user systems 28a, 28b may be implemented by a shared server or client system.

In some embodiments, the data processing system 26 is configured to provide a frontend for receiving data input from one or more data ingestion sources. As one example, in some embodiments, the data processing system 26 is configured to provide a buffer having a high write speed configured to record each event received from a plurality of source systems, although it will be appreciated that the data processing system 26 can include any suitable ingestion systems. In some embodiments, one or more of the client systems 28a, 28b are configured as data sources. Additionally, the data processing system 26 can be configured to receive and process commands or requests generated by one or more client systems 28a, 28b. Commands may include, but are not limited to, queries, updates, combinations, etc.

In some embodiments, each of the distributed servers 24a-24c is configured to maintain one or more of an active copy and/or a replica copy of a portion of a distributed database (e.g., a partition or shard). Each distributed server 24a-24c can be located on a separate system, such as a separate server, and/or on a logical partition of a single server. In some embodiments, at least one distributed server 24a-24c maintains an active copy of a first partition and at least one distributed server 24a-24c maintains at least one replica (or backup) copy of the first partition. The active copy of the first partition is configured to receive queries, input, updates, and/or otherwise perform processing with respect to the data maintained therein. The at least one replica of the first partition is configured to mirror the actions performed on or by the active copy to provide a redundant backup if the active copy becomes unavailable. In some embodiments, multiple active copies and/or multiple replica copies are maintained by each distributed server 24a-24c.

In some embodiments, a distributed database management system 22 is configured to manage the active and replica copies of each partition maintained by the distributed servers 24a-24c. For example, in some embodiments, the distributed database management system 22 maintains a log identifying the location and status of each active partition (e.g., active copy of a partition) and/or replica partition (e.g., backup copy of the partition) maintained in the distributed servers 24a-24c. The database management system 22 may be configured to convert a replica partition to an active partition in the event that the current active partition fails and/or become unresponsive. The distributed database management system 22 may be further configured to instantiate a replacement (e.g., new) replica copy when a current replica partition is converted to an active partition, as described in greater detail below.

Figure 3:
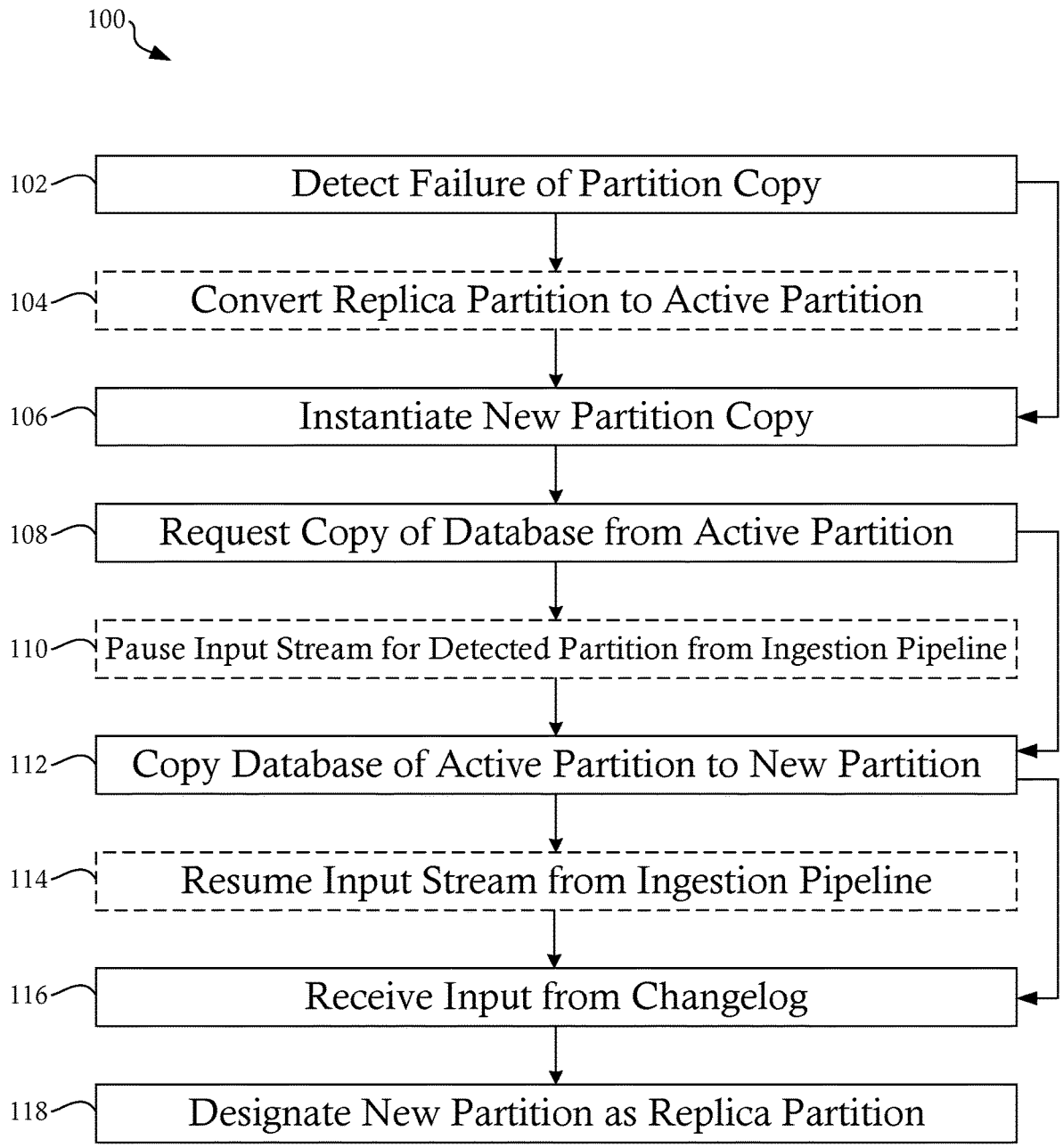
FIG. 3 is a flowchart illustrating a method of bootstrapping a new partition from an existing partition, in accordance with some embodiments.
Figure 4:
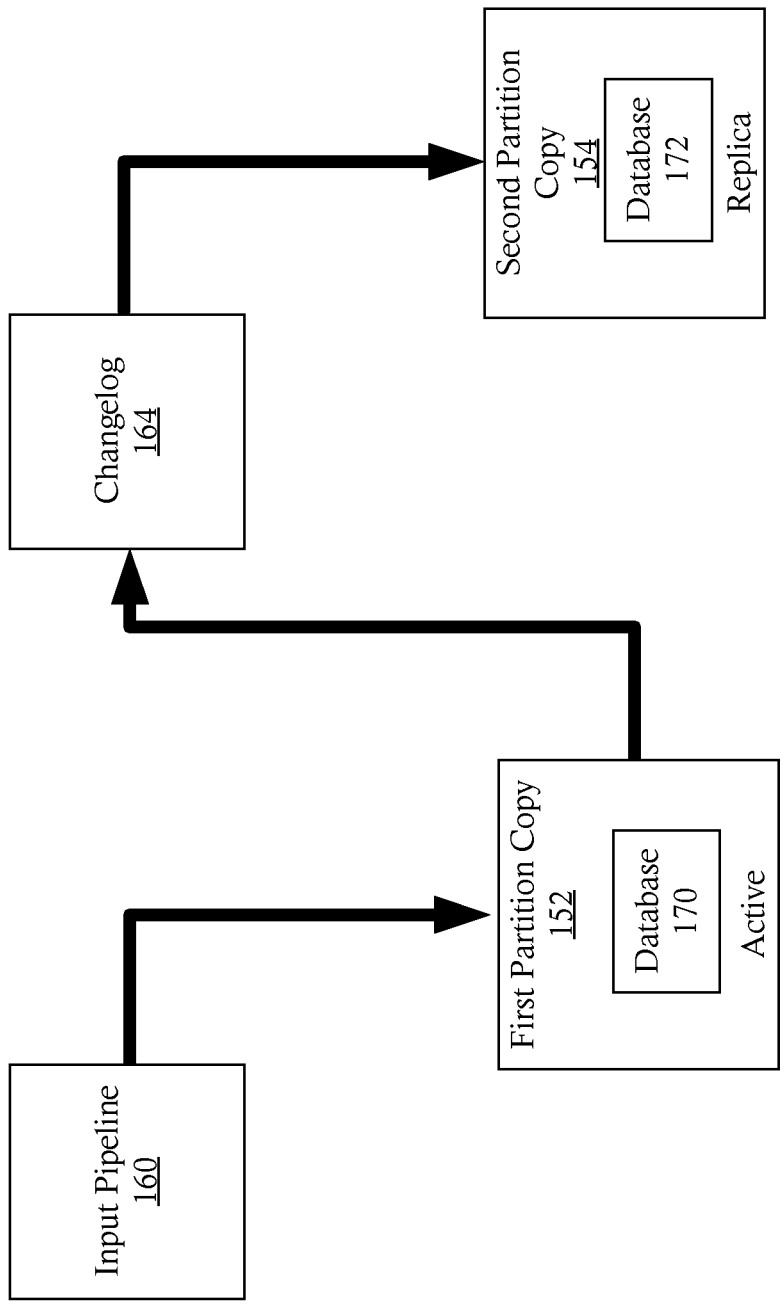
FIG. 4 illustrates a distributed database having a first partition and a second partition at an initial time to, in accordance with some embodiments.
Figure 5:
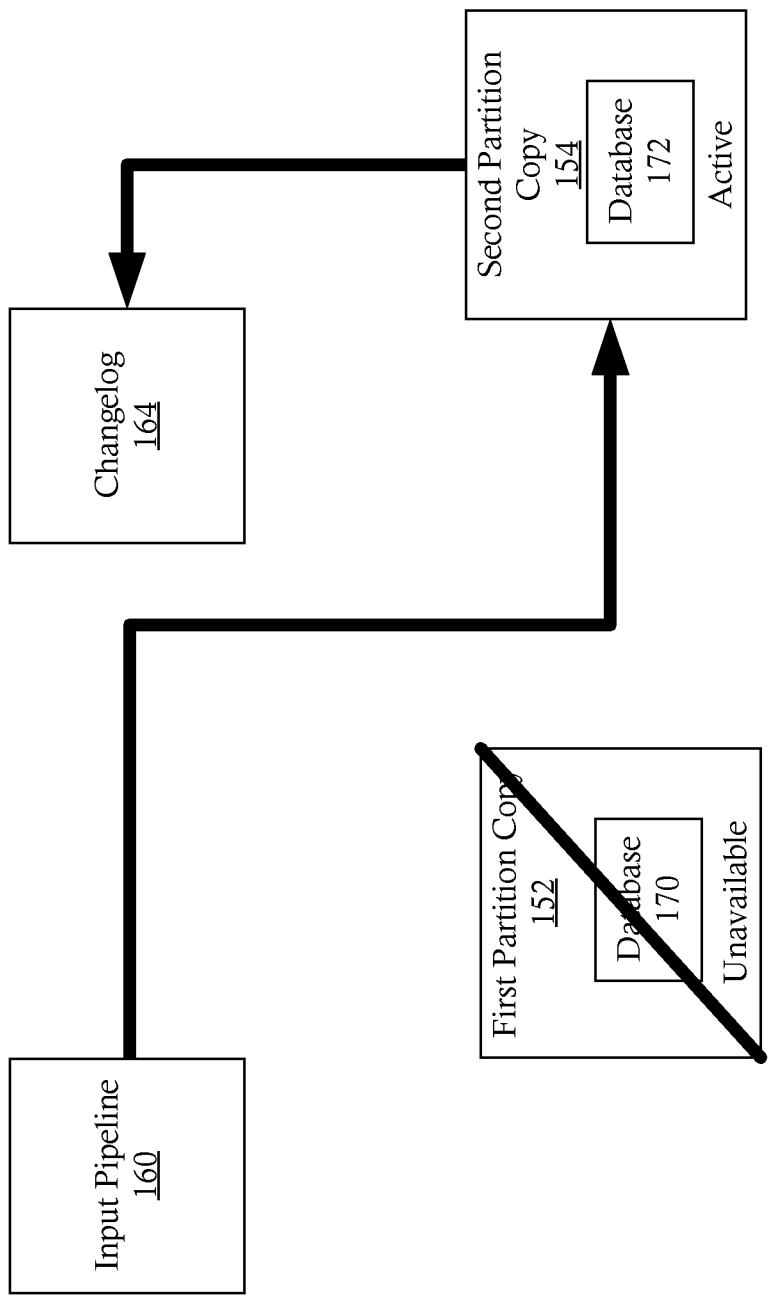
FIG. 5 illustrates the distributed database of FIG. 4 at time $t_1$ after the second partition has been converted to an active partition, in accordance with some embodiments.
Figure 6:
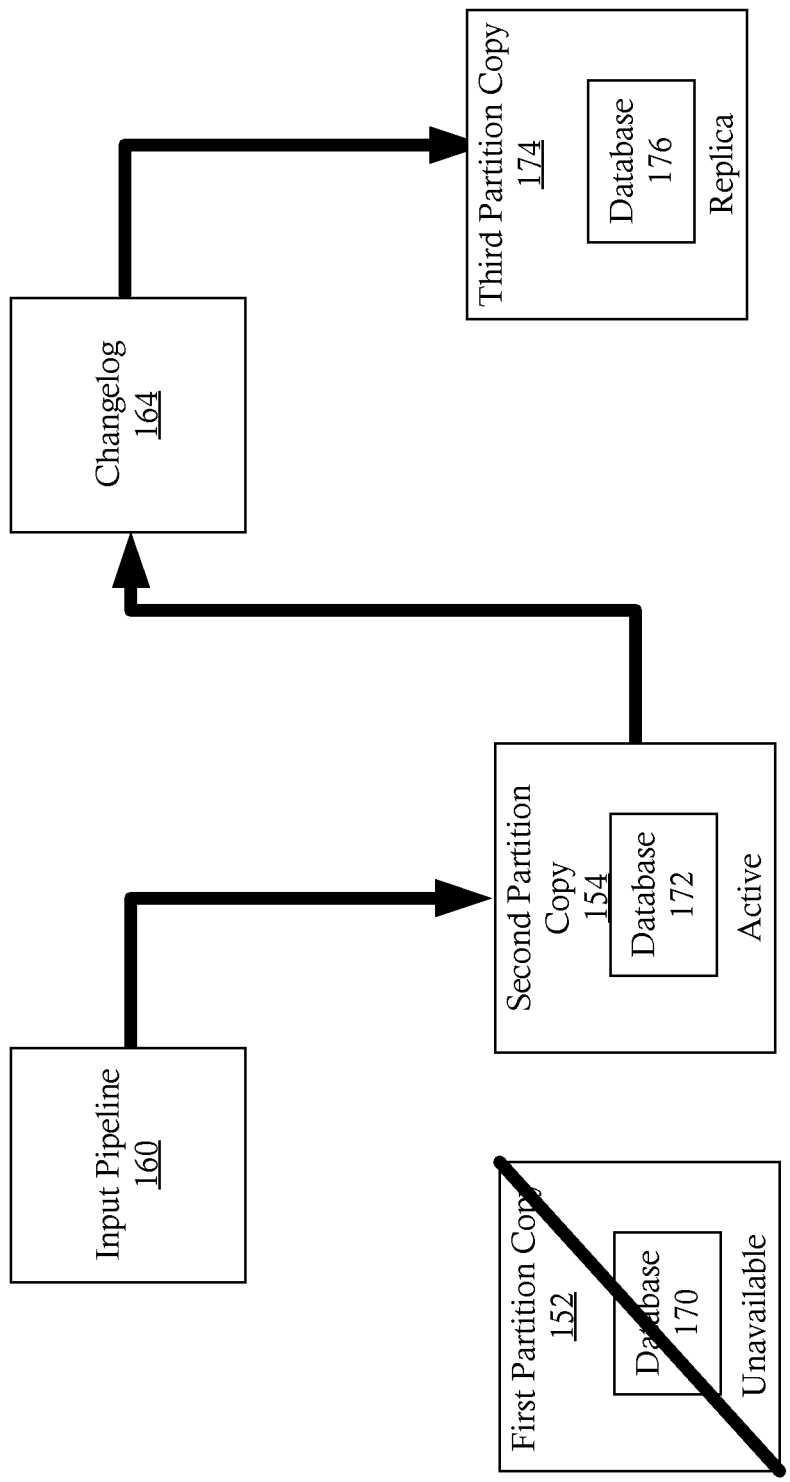
FIG. 6 illustrates the distributed database of FIG. 4 at time $t_3$ after a third partition has been bootstrapped from the second partition, in accordance with some embodiments.

FIG. 3 is a flowchart illustrating a method 100 of bootstrapping a new partition from an existing partition, in accordance with some embodiments. FIGS. 4-6 illustrate various elements of a distributed database 150 during execution of the method 100, in accordance with some embodiments. As illustrated in FIG. 4, at an initial time to (e.g., prior to execution of the method 100), a distributed database 150 includes a first partition 152 set as an active partition and a second partition 154 set as a replica partition. The first partition 152 is configured to receive input (e.g., commands, data, etc.) from an input pipeline 156. The input pipeline 156 may be executed by any suitable system, such as database management system 22, data processing system 26, and/or any other suitable system.

Input 160 is provided from the input pipeline 156 to the first partition 152. The first partition 152 updates one or more records (e.g., updates the database) in response to the input 160 from the input pipeline 156 and generates an output 162 indicative of the changes made to the first partition 152. Output 162 is received by a changelog 164 that maintains a record of each change made to the active partition, the first partition 152 at time to. The changelog 164 may be time-limited such that changes are maintained only for a predetermined time period. For example, in some embodiments, entries are maintained in the changelog 164 only for a predetermined number of minutes or hours before being removed. In other embodiments, the changelog 164 may be configured to maintain a predetermined number of changelog entries, such as the last X operations performed on or by the active partition.

The changelog 164 is configured to provide an input 166 to a replica partition, e.g., the second partition 154 at time to. The input 166 is similar to the input 160 provided from the input pipeline 156 to the first partition 152. The second partition 154 updates one or more records in response to the input 166 from the changelog 164. The changes made to the second partition 154 are identical to the changes made to the first partition 152 and recorded in the changelog 164 such that the second partition 154 includes a time-delayed mirror image of the first partition 154.

At time $t_1$, one of the existing partitions 152, 154 within the distributed database 150 fails. The failure may be caused by a server failure, a network outage, fault testing, etc. At step 102, the failure of the partition 152, 154 is detected. For example, in some embodiments, a database management system 22 is configured to poll each partition 152, 154 within the distributed database 150 at a predetermined interval to verify the health and responsiveness of each partition 152, 154. If a response is not received within a predetermined time period, the partition 152, 154 is considered to have failed. If the failed partition is an active partition, e.g., the first partition 152, the method 100 proceeds to step 104. If the failed partition is a replica partition, e.g., the second partition 154, the method proceeds directly to step 106. In some embodiments, the database management system 22 maintains a list of partitions and designations (e.g., active, replica, paused, etc.) that is used to identify the failed partition.

At step 104, an existing replica partition is selected and converted to the active partition. For example, as shown in FIG. 5, at time $t_2$, the second partition 154 has been designated as the active partition due to the failure of the first partition 152. The second partition 154 now receives input 160 directly from the input pipeline 156. However, because the second partition 154 has been converted to the active partition, there is no longer a replica copy for this partition, as required by the distributed database 150.

At step 106, and as shown in FIG. 6, a third partition 174 is instantiated with an empty database 176. At step 108, (time $t_3$) the third partition 174 requests a copy of the database 172 of the active partition, i.e., the second partition 154. The request may be sent directly to the second partition 154 (e.g., to a system maintaining the second partition 154) and/or to a database management system 22, which initiates the transfer.

At optional step 110, the input stream 160 from the ingestion pipeline 156 is paused to prevent updates to the database 172 of the active, second partition 154 during the transfer. For example, in some embodiments, the second partition 154 may be transitioned from an active state to a backup or duplicate state configured to allow copying of the database 172. In some embodiments, the ingestion pipeline 156 is placed in a buffering mode in which events in the ingestion pipeline 156 are stored in a buffer for later transfer to and processing by the active partition.

At step 112, the database 172 of the second partition 154 (e.g., the source database) is copied to the database 176 of the third partition 174 (e.g., the destination database). The source database includes a time stamp or other identifier indicating the time at which the source database was last updated (e.g., the time of the last event from the ingestion pipeline 156). After copying the source database 172, at optional step 114, the input 160 from the ingestion pipeline 156 is resumed and the second partition 154 begins updating and generating an output 162 for the changelog 164.

At step 116, the third partition 174 receives an input 166 from the changelog 164. The input 166 includes a set of events received by the changelog 164 from the active partition within the predetermined time limit. For example, if the predetermined time limit is greater than the time $t_3-t_1$, the changelog 164 includes at least some events recorded when the first partition 152 was designated as active and all events recorded when the second partition 154 was designated as active). As another example, if the predetermined time limit is less than or equal to the time $t_3-t_1$, the changelog 164 includes only events recorded after failure of the first partition 152. The third partition 174 ignores any event that occurred prior to the time indicated in the time stamp copied from the source database 172, i.e., any event that would have been processed by the second partition 154 before the database 172 was copied. The third partition 174 executes each event in the changelog 164 that occurred after the database 172 was copied, i.e., having a time indicated after the time stamp copied from the source database 172. The third replica 170 executes each event until all events have been executed and, at step 118 corresponding to time $t_4$, the third partition 170 is designated as a replica partition.

The method 100 provides reduced data use and faster replica creation times as compared to traditional methods of generating a replica from a changelog. For example, in the illustrated embodiment, the changelog 164 is time-limited and maintains only a subset of the events processed by the active partition, reducing the amount of memory that must be dedicated to the changelog 164. In addition, because only a subset of the events in the time-limited changelog 164 must be processed by a new replica, the time from instantiation to completion of a new replica is reduced using the method 100.

Figure 7:
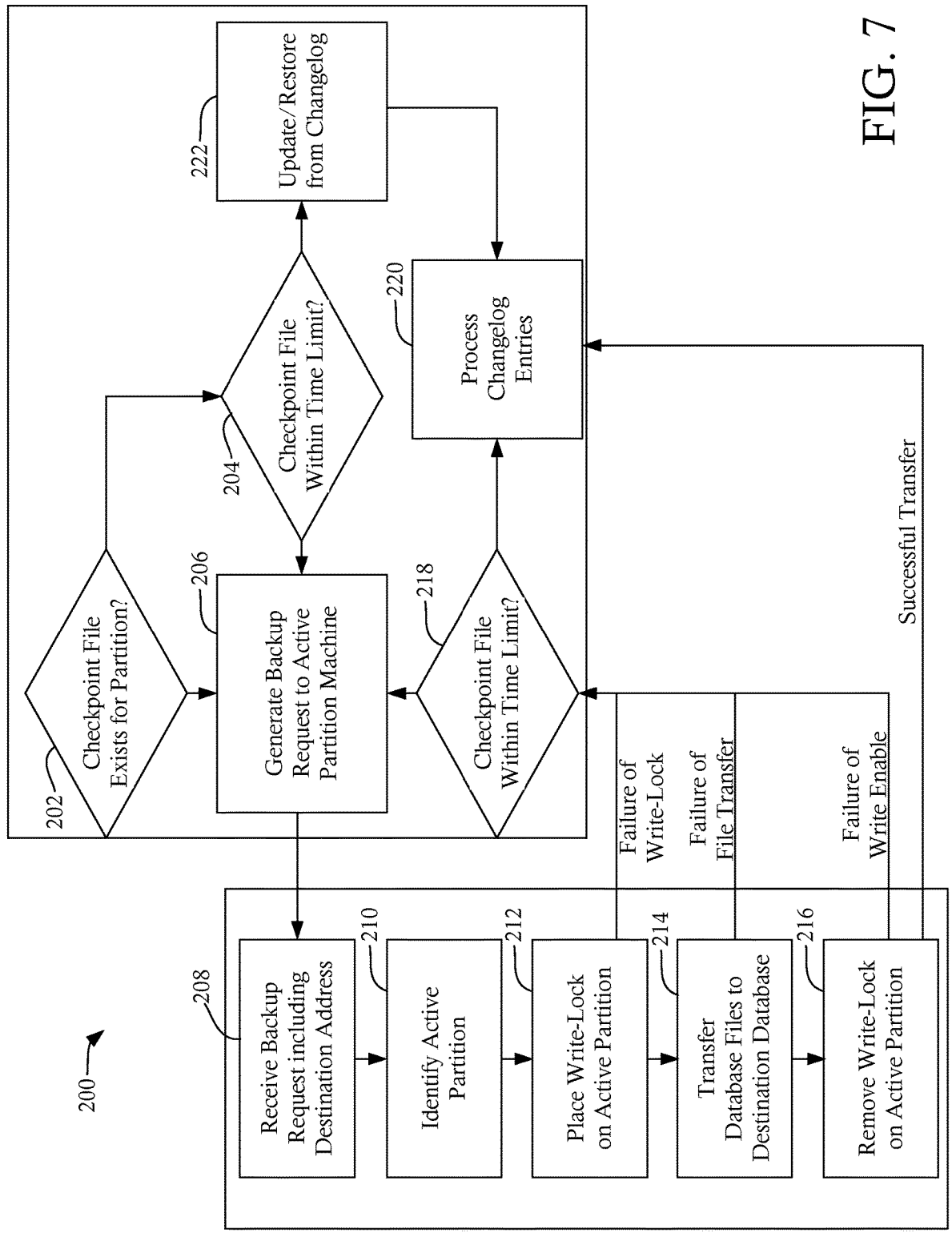
FIG. 7 illustrates a system flow of a system including two databases during execution of a method of generating a replica partition, in accordance with some embodiments.

FIG. 7 illustrates a system flow 200 of a distributed database system 200 included two database systems 24d, 24e during execution of a method of bootstrapping a replica partition, in accordance with some embodiments. The system flow 200 is similar to the method 100 discussed above, and similar description is not repeated herein. The first database system 24d includes an active partition and the second database system 24e includes a new and/or previously created replica partition. After failure of an active or replica copy of a partition, a database management system 22 (not shown) generates a request for the second database system 24e to generate a new replica copy. The second database system 24e determines if a checkpoint file exists for a replica partition. A checkpoint file indicates the replica partition is maintained by the second database system 24e and indicates the last time the replica partition was updated from the changelog. If a checkpoint file is detected, than a replica of the active partition may already exist on the second database system 24e.

The second database system 24e determines 204 if the checkpoint file is older than the predetermined retention time limit of the changelog. For example, if the checkpoint file was created at a time $t_{checkpoint}$ that is less than or equal to a retention time limit of the changelog, the replica copy maintained by the second database system 24e is current and can be updated 222 based solely on the existing changelog entries and a new replica is not needed. For example, if a first replica copy maintained by the second database system 24e becomes unresponsive, a database management system 22 may instruct the second database system 24e to instantiate a new replica copy to replace the unresponsive first replica copy. If the first replica copy becomes responsive again prior to the second database system 24e creating the new replica, the second database system 24e may simply update the now-responsive first replica copy from the changelog.

If the checkpoint file was created at a time $t_{checkpoint}$ that is greater than the retention time limit of the changelog, the replica partition cannot be restored solely from the changelog and the second database system 24e instantiates a new replica and/or overwrites the database of the existing replica. A backup request is generated 206 and transmitted to the first database system 24d, e.g., the database system containing the active partition. The backup request includes a request to copy the current database of the active partition (e.g., the source database) to the database of the replica partition (e.g., the destination database). The first database system 24d containing the active partition may be identified based on metadata maintained by, for example, a database management system 22. In some embodiments, the backup request includes a representational state transfer (REST) request.

The first database system 24d receives 208 the backup request and identifies 210 the active partition within the system 24d, for example, based on provided metadata. The first database system 24d places 212 a write-lock on the active partition, e.g., transitions the active partition to a read-only mode. In some embodiments, if the active partition is not in a running state, the write-lock may fail. For example, the active partition may be suspended (e.g., the partition has not received new metadata designating the partition as the active partition), in a restoring state (e.g., the partition was a replica partition that is transitioning to an active partition and is updating data from the changelog before entering the running state), and/or in any other non-running state. If the write-lock fails, first database system 24d sends a failure message to the second database system 24e.

If the write-lock is successful, the first database system 24d transfers 214 files from the source database to the destination database. After transferring the source database copy (e.g., copies of the files contained in the source database), the first database system 24d transitions 216 the active partition back to a read/write mode. The second database system 24e executes 220 changelog entries generated after a time stamp in the checkpoint file that was copied from the source database and designates the new partition as a replica partition.

If the transfer fails. e.g., the active partition could not be placed in a write-lock state, the network connection is interrupted, rebalancing is initiated in the cluster prior to completion of the transfer, etc., the second database system 24e determines 218 whether enough of the source database was copied to allow the replica partition to be generated from the changelog entries. If a sufficient portion of the source database was copied, the second database system 24e executes 220 the changelog entries generated after the checkpoint file of the copied files. If a sufficient portion of the active partition was not copied, the second database system 24e retries the backup request after a predetermined time delay.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a computing device configured to:
maintain a distributed database comprising a first partition copy and a second partition copy each containing a database with a checkpoint file, the checkpoint file being configured to identify a time of a most-recent update to the database of the corresponding partition;
detect a failure of the first partition copy;
generate a third partition copy including an empty database;
copy the database of the second partition copy to the empty database of the third partition copy;
designate the third partition copy as one of an active partition copy or a replica partition copy, wherein the distributed database comprises a changelog configured to provide a plurality of events from the active partition copy to the replica partition copy, and wherein the changelog includes a first set of events recorded prior to detection of the failure of the first partition copy and a second set of events recorded after detection of the failure of the first partition copy;
determine a checkpoint time of the checkpoint file included in the database of the second partition copy; and
update the third partition copy based on a subset of the plurality of events in the changelog that occurred after the checkpoint time.

2. The system of claim 1, wherein the first partition copy is designated as the active partition copy and the second partition copy is designated as the replica partition copy, and wherein the computing device is configured to:
convert the second partition copy from the replica partition copy to the active partition copy when failure of the first partition copy is detected; and
designate the third partition copy as the replica partition copy after copying the database of the second partition copy.

3. The system of claim 1, wherein the distributed database comprises a data pipeline configured to provide input data to the active partition copy, and wherein the computing device is configured to:
redirect the data pipeline to the second partition copy when failure of the first partition copy is detected;
pause processing of the data pipeline prior to copying the database of the second partition copy; and
resume processing of the data pipeline after copying the database of the second partition copy.

4. The system of claim 1, wherein the changelog is time-limited.

5. The system of claim 1, wherein the computing device is configured to:
maintain the checkpoint file in each database.

6. The system of claim 1, wherein the computing device is configured to redirect the plurality of events from the changelog to the third partition copy when the third partition copy is designated as the replica partition copy.

7. The system of claim 1, wherein the computing device is configured to detect failure of the first partition copy by polling each of the first partition copy and the second partition copy at a predetermined polling rate.

8. A non-transitory computer readable medium having instructions stored thereon, wherein the instructions, when executed by a processor cause a device to perform operations comprising:
maintaining a distributed database comprising a first partition copy and a second partition copy each containing a database with a checkpoint file, the checkpoint file being configured to identify a time of a most-recent update to the database of the corresponding partition;
detecting a failure of the first partition copy;
generating a third partition copy including an empty database;
copying the database of the second partition copy to the empty database of the third partition copy;
designating the third partition copy as one of an active partition copy or a replica partition copy, wherein the distributed database comprises a changelog configured to provide a plurality of events from the active partition copy to the replica partition copy, and wherein the changelog includes a first set of events recorded prior to detection of the failure of the first partition copy and a second set of events recorded after detection of the failure of the first partition copy;
determining a checkpoint time of the checkpoint file included in the database of the second partition copy; and
updating the third partition copy based on a subset of the plurality of events in the changelog that occurred after the checkpoint time.

9. The non-transitory computer readable medium of claim 8, wherein the first partition copy is designated as the active partition copy and the second partition copy is designated as the replica partition copy, and wherein the instructions, when executed by the processor, cause the device to perform further operations comprising:
converting the second partition copy from the replica partition copy to the active partition copy when failure of the first partition copy is detected; and
designating the third partition copy as the replica partition copy after copying the database of the second partition copy.

10. The non-transitory computer readable medium of claim 8, wherein the distributed database comprises a data pipeline configured to provide input data to the active partition copy, and wherein the instructions, when executed by the processor, cause the device to perform further operations comprising:
redirecting the data pipeline to the second partition copy when failure of the first partition copy is detected;
pausing processing of the data pipeline prior to copying the database of the second partition copy; and
resuming processing of the data pipeline after copying the database of the second partition copy.

11. The non-transitory computer readable medium of claim 8, wherein the changelog is time-limited.

12. The non-transitory computer readable medium of claim 8, wherein the instructions, when executed by the processor, cause the device to perform further operations comprising:
maintaining the checkpoint file in each database.

13. The non-transitory computer readable medium of claim 8, wherein the instructions, when executed by the processor, cause the device to perform further operations comprising redirecting the plurality of events from the changelog to the third partition copy when the third partition copy is designated as the replica partition copy.

14. The non-transitory computer readable medium of claim 8, wherein the instructions, when executed by the processor, cause the device to perform further operations comprising detecting failure of the first partition copy by polling each of the first partition copy and the second partition copy at a predetermined polling rate.

15. A method, comprising:
maintaining a distributed database comprising a first partition copy and a second partition copy each containing a database with a checkpoint file, the checkpoint file being configured to identify a time of a most-recent update to the database of the corresponding partition;
detecting a failure of the first partition copy;
generating a third partition copy including an empty database;
copying the database of the second partition copy to the empty database of the third partition copy;
designating the third partition copy as one of an active partition copy or a replica partition copy, wherein the distributed database comprises a changelog configured to provide a plurality of events from the active partition copy to the replica partition copy, and wherein the changelog includes a first set of events recorded prior to detection of the failure of the first partition copy and a second set of events recorded after detection of the failure of the first partition copy;
determining a checkpoint time of the checkpoint file included in the database of the second partition copy; and
updating the third partition copy based on a subset of the plurality of events in the changelog that occurred after the checkpoint time.

16. The method of claim 15, wherein the first partition copy is designated as the active partition copy and the second partition copy is designated as the replica partition copy, the method comprising:
converting the second partition copy from the replica partition copy to the active partition copy when failure of the first partition copy is detected; and
designating the third partition copy as the replica partition copy after copying the database of the second partition copy.

17. The method of claim 15, wherein the first partition copy is designated as the active partition copy and the second partition copy is designated as the replica partition copy, the method comprising:
redirecting a data pipeline to the second partition copy when failure of the first partition copy is detected;
pausing processing of the data pipeline prior to copying the database of the second partition copy; and
resuming processing of the data pipeline after copying the database of the second partition copy.

18. The method of claim 15, wherein the changelog is time-limited.

19. The method of claim 15, comprising:
maintaining the checkpoint file in each database.

20. The method of claim 15, wherein the instructions, comprising redirecting the plurality of events from the changelog to the third partition copy when the third partition copy is designated as the replica partition copy.

* * * * *